United States Patent
Uesugi et al.

(10) Patent No.: US 7,316,798 B2
(45) Date of Patent: Jan. 8, 2008

(54) BIAXIAL ORIENTATION BLOW MOLDING PROCESS

(75) Inventors: Daisuke Uesugi, Matsudo (JP); Masao Hattori, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 683 days.

(21) Appl. No.: 10/495,866

(22) PCT Filed: Jan. 22, 2003

(86) PCT No.: PCT/JP03/00520

§ 371 (c)(1),
(2), (4) Date: Jul. 1, 2004

(87) PCT Pub. No.: WO03/061947

PCT Pub. Date: Jul. 31, 2003

(65) Prior Publication Data

US 2004/0262817 A1    Dec. 30, 2004

(30) Foreign Application Priority Data

Jan. 22, 2002 (JP) ............................. 2002-013079

(51) Int. Cl.
*B29C 49/18* (2006.01)
(52) U.S. Cl. ..................... 264/530; 264/535
(58) Field of Classification Search ............... 264/530, 264/535
See application file for complete search history.

(56) References Cited

U.S. PATENT DOCUMENTS

| 4,550,007 | A | | 10/1985 | Ohtsu et al. |
| 5,277,574 | A | | 1/1994 | Denis et al. |
| 5,510,079 | A | * | 4/1996 | Sugiura et al. ............. 264/521 |
| 5,785,921 | A | * | 7/1998 | Outreman et al. .......... 264/529 |

FOREIGN PATENT DOCUMENTS

GB    2 108 899 A    5/1983

\* cited by examiner

*Primary Examiner*—Suzanne E. McDowell
(74) *Attorney, Agent, or Firm*—Oliff & Berridge PLC

(57) ABSTRACT

The double blow molding process comprises a primary blow molding step of biaxially drawing and blow molding the preform into a primary intermediate product, a step of heating the primary intermediate product to shrink-mold it into the secondary intermediate product, and a secondary blow molding step of molding the secondary intermediate product into a bottle. This double blow molding process is characterized in that, just before the secondary blow molding step, the secondary intermediate product on standby is maintained at a temperature at least 40° C. or 50° C. higher than the mold temperature used in said secondary blow molding step. From such a temperature, it is possible to determine the double blow molding conditions, which can correspond to the levels of heat resistance required for the bottles, and to provide, with high productivity, the bottles having necessary levels of heat resistance.

5 Claims, 1 Drawing Sheet

BIAXIAL ORIENTATION BLOW MOLDING PROCESS

TECHNICAL FIELD

This invention relates to a process for biaxially drawing and blow-molding a bottle made of a polyethylene terephthalate resin, and in particular, to a process for biaxially drawing and blow-molding a bottle made of a polyethylene terephthalate resin having high resistance to thermal shrinkage while maintaining high transparency.

BACKGROUND OF THE INVENTION

The polyethylene terephthalate resin (hereinafter referred to simply as PET) has stable physical properties, high transparency, and high mechanical strength, and causes no pollution. PET is thus utilized in large quantities in various fields of application in the form of biaxially drawn, blow-molded bottles, and is quite useful especially for the bottles containing foods and drinks.

As described above, the PET bottles effectively demonstrate various excellent properties. Unfortunately, however, these biaxially drawn, blow-molded PET bottles are weak against heat and are easily deformed at a high temperature of 70° C. or more unless they are heat-treated.

For this reason, there is an urgent need for the commercialization of a highly heat-resistant PET bottle. As a method of giving heat-resisting property to the PET bottle, the applicant of this invention developed a technique called the "double blow molding process" (See Patent Publication No. 1992-56734). Bottles or containers based on this process are already in use for retort-packed foods that require heat treatment at 120° C. for 30 minutes or for other heat-treated foods.

This double blow molding technique comprises a primary blow molding step of biaxially drawing and blow molding the already molded preform of a desired shape to mold the preform into a primary intermediate product, a step of heating this primary intermediate product to shrink-mold it thermally into a secondary intermediate product, and lastly a secondary blow molding step of molding this secondary intermediate product into a bottle. When the primary intermediate product is heated and subjected to thermal shrinkage, there disappears residual distortion that has been created inside the primary intermediate product, and crystallization is promoted so that quite highly heat-resistant bottles can be obtained.

Recently, however, there is a wider range of applications than ever, not only for the containers used for the retort-packed foods that require heat treatment at a high temperature of 120° C., but also for the containers or bottles that are required to resist a heat in the range of 80-95° C. because of a necessity for heating the contents and filling them into bottles or containers. Therefore, from a point of view of production speed or energy saving, there is a need for a highly productive double blow molding process that can be used to mold heat-resistant bottles or containers.

This invention has been made to meet the above-described requirements. The technical problem of this invention is to provide a double blow molding process that can deal with various levels of heat-resistant property required for bottles. The object of this invention is to provide bottles having a necessary heat-resisting property, which can be manufactured with high productivity.

DISCLOSURE OF THE INVENTION

The means of carrying out the invention of Claim 1 to solve the above-described technical problem exists in the configuration:
that this means involves the double blow molding process, which comprises a primary blow molding step of biaxially drawing and blow molding the preform into a primary intermediate product, a step of heating said primary intermediate product to shrink-mold it forcibly into said secondary intermediate product, and a secondary blow molding step of molding said secondary intermediate product into a bottle; and
that, just before the secondary blow molding step, the secondary intermediate product on standby is maintained at a temperature at least 40° C. higher than the mold temperature used in said secondary blow molding step.

The double blow molding technique comprises the primary blow molding step of biaxially drawing and blow molding the already molded preform of a desired shape to mold the preform into a primary intermediate product, the step of heating this primary intermediate product to shrink-mold it thermally into a secondary intermediate product, and lastly the secondary blow molding step of molding this secondary intermediate product into a bottle.

In the primary blow molding step, the preform is biaxially drawn and blow-molded into the primary intermediate product by heating the preform to a temperature in the range of 80 to 120° C., the blow-moldable temperature range in which a drawing effect can be achieved, including the temperature of 120° C. at which PET is on the verge of thermal crystallization.

The mold temperature used in the secondary blow molding step (hereinafter referred to as the secondary blow mold temperature) is set at a temperature ranging from roughly the heat-resistant temperature to 30° C. above the heat-resistant temperature, depending on the required heat-resistant temperature. In this temperature range, the residual stress created during the secondary blow molding is removed, and it becomes possible to prevent the deformation of the bottle from occurring at the heat-resistant temperature required for the bottle.

The molding process according to Claim 1 involves that, just before secondary blow molding step, the secondary intermediate product on standby is maintained at a temperature at least 40° C. higher than the mold temperature used in said secondary blow molding step (This temperature is hereinafter referred to as the temperature just before the secondary blow molding). At this temperature, the bottle acquires a good shape.

If the secondary intermediate product had a temperature difference less than 40° C., it would reach the mold temperature in a short period. In that case, the bottle would have a poor shape in the secondary blow-molding step. It would become difficult for the finished bottle to have uniform wall thickness and reproducibility of the shapes in such portions as irregular surfaces and edges.

The means of carrying out the invention of Claim 2 comprises that, in the invention of Claim 1, the product on standby just before the second blow molding is maintained at a temperature at least 50° C. higher than the second blow mold temperature.

As compared to the molding of the bottle having heat resistance to a relatively low temperature in the range of 80-95° C., the bottle having heat resistance to relatively high temperatures, such as used for retort-packed foods, can be obtained by setting a high temperature for the secondary blow mold and setting a high heating temperature just before the secondary blow molding, to keep pace with the high secondary blow mold temperature. When the secondary intermediate product is maintained at a temperature at least 50° C. higher than the secondary blow mold temperature, it is possible to give a good shape not only to the bottles having heat resistance to a relatively low temperature in the range of 80-95° C., but also to the bottles having heat resistance to relatively high temperatures.

The upper limit to the temperature just before the secondary blow molding is determined by the set time and the upper limit to the temperature at which the primary intermediate product is heated.

The means of carrying out the invention of Claim 3 comprises that, in the invention of Claim 1 or 2, the secondary intermediate product is put in the secondary blow mold in not later than 20 seconds after the product has been taken out of the previous heating furnace.

The primary intermediate product is heated in a heating furnace or by other means and is forced to shrink in size thermally into the secondary intermediate product. The temperature at which the primary intermediate product is heated in the heating furnace is determined, while taking into consideration the extent to which the secondary intermediate product is left cooling during the time required to take the secondary intermediate product out of the heating furnace and put it in the secondary blow mold (hereinafter referred to as the set time) and the temperature of the secondary intermediate product just before the above-described secondary blow molding. The upper limit to the temperature at which the primary intermediate product is heated is about 235° C. Above this temperature, partial melting occurs in the micro-crystals of PET formed by the primary blow molding. As a result, thermal recrystallization proceeds, and the PET is whitened.

The molding process of Claim 3 specifies the set time within 20 seconds. As described above, there is a limit of about 235° C. to the temperature of the heated primary intermediate product. Therefore, if the set time exceeds 20 seconds, then before the secondary blow-molding step, the temperature of the secondary intermediate product drops down to too low a level because of the cooling velocity experienced when it is taken out of the heating furnace and left standing in the ambient atmosphere. In that case, just before the secondary blow molding, it becomes difficult to maintain the secondary intermediate product on standby at a temperature at least 40° C. higher than the secondary blow mold temperature. It becomes also difficult to provide bottles having heat resistance to a temperature in the range of 80-95° C., even when the resistance at this level is required for various applications in which the contents have to be heated to fill them in the bottles.

Meanwhile, if it happens that the set time cannot be reduced to several seconds for any reason, such as the layout of production equipment, the bottles having heat resistance to a temperature in the range of 80-95° C. can still be obtained as far as the set time within 20 seconds is available. Thus, the molding process of Claim 3 can be used in a wide field of applications.

The means of carrying out the invention of Claim 4 comprises that, in the invention of Claim 3, a set time within 6 seconds is used from the time when the heated secondary intermediate product is taken out of the heating furnace to the time when it is put in the secondary blow mold.

If the set time within 6 seconds is used, the temperature drop in the ambient atmosphere can be reduced, thus making it easy to manufacture the bottles having high heat resistance. Such bottles can fully meet the requirement for the heat resistance to 120° C. at which retort-packed-foods are treated. When the bottles having heat resistance to a temperature in the range of 80-95° C. are manufactured, a shorter set time enables the primary intermediate product to be heated at a lower temperature in the heating furnace. As a result, production efficiency can be raised in the aspects of shortened manufacturing time and energy saving.

As described above, the temperature just before the secondary blow molding and the set time are specified to fall within appropriate ranges in accordance with the process of this invention. These settings also permit the heating temperature to be suitably determined for the primary intermediate product. Thus, it has become possible to present optimum molding conditions for highly effective production in response to the required heat resistance.

PREFERRED EMBODIMENTS OF THE INVENTION

Figure 1:
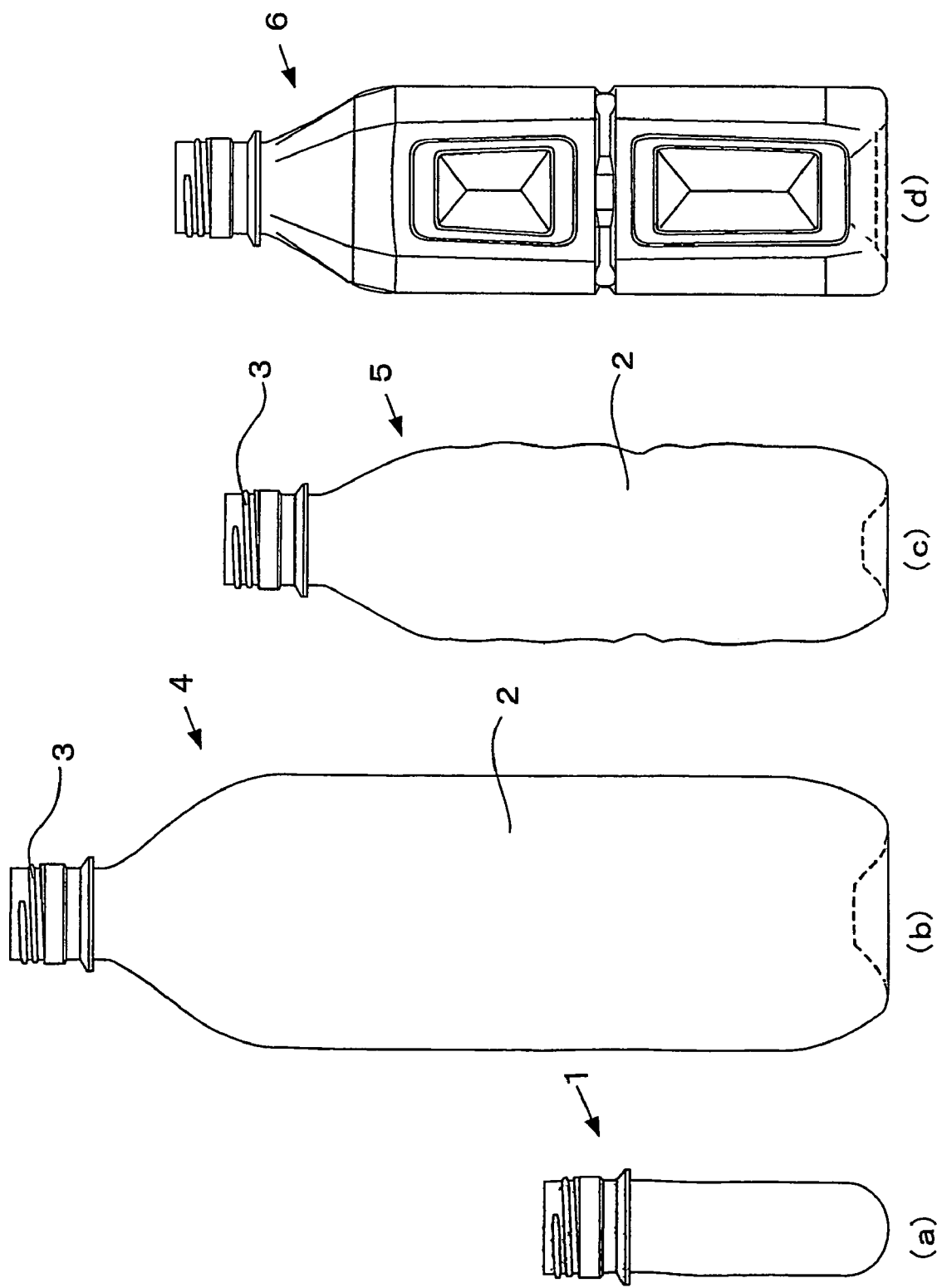
FIG. 1 is an explanatory front view showing a lineup of preform and products from the steps of the molding process of this invention.

This invention is further described with respect to the preferred embodiments, now referring to the drawings.

FIG. 1 is a front view showing (a) preform 1, (b) primary intermediate product 4, (c) secondary intermediate product 5, and (d) final product of bottle 6, illustrated in a row in one embodiment of the biaxial drawing and blow-molding process according to this invention.

The biaxial drawing and blow-molding process according to this invention comprises a primary blow-molding step in which the preform 1 is biaxially drawn and blow-molded into a primary intermediate product 4, a heating step in which the body 2, including bottom but excluding neck 3, of the primary intermediate product 4 is heated and forced to shrink in size thermally into a secondary intermediate product 5, and finally a secondary blow-molding step of molding this secondary intermediate product 5 into a bottle 6.

The primary blow-molding step can be the same operation as an ordinary biaxial drawing and blow-molding operation. In the next heating step, the primary intermediate product 4 is heated and forced to shrink in size thermally into the secondary intermediate product 5. This heating step is necessary to eliminate forcibly the internal residual stress created inside the biaxially drawn, blow-molded product and to promote crystallization. The same mold for the primary blow-molding step is used in this heating step. Various drawn and molded portions of this primary intermediate product 4 are left to deform freely in response to the internal residual stress created inside these portions of the primary intermediate product 4 so that this internal residual stress is forcibly cleared away.

The deformation of this primary intermediate product 4 according to the internal residual stress created inside the drawn and molded portions is naturally the shrinking deformation. The magnification, at which the preform 1 is drawn and molded into the primary intermediate product 4, and the size of the primary intermediate product 4 are determined in such a way that the size of the body 2, the portion of the secondary intermediate product that has been drawn and molded by this shrinking deformation, is roughly identical with or slightly smaller than the drawn and molded body and bottom of the finished bottle 6, as shown in FIG. 1.

Lastly, the secondary blow-molding step is carried out in a manner similar to ordinary biaxial drawing and blow molding although this time, the magnification is smaller than in the primary blow-molding step.

EXAMPLES

Double blow molding was conducted at a preform-heating temperature of 115° C. under the molding conditions listed in Table 1 to obtain PET bottles of Examples 1 to 4. The preform, the primary intermediate product, the secondary intermediate product, and the bottle have the shapes shown respectively in FIGS. 1(a), (b), (c), and (d).

Bottles 6 of Examples 2, 3, and 4 were obtained by using the molding conditions shown in Table 1. All the bottles 6 had uniform wall thickness and good reproducibility of the bottle shape. The heat-resistant temperatures of these bottles were as shown in Table 1. The bottle 6 of Example 3 can be thermally treated at 120° C. for use with retort-packed foods. If a set time within 6 seconds is used, this bottle is found to be able to meet the requirement for a wide range of heat resistance.

A set time of 20 seconds was used in Example 4. When the heating temperature was set at 230° C., the secondary intermediate product just before the secondary blow mold-

|  | Primary blow mold temperature (° C.) | Heating temperature (° C.) | Temperature just before secondary blow molding (° C.) | Set time (sec) | Secondary blow mold temperature (° C.) | Heat-resisting temperature (° C.) |
|---|---|---|---|---|---|---|
| Example 1 | 140 | 170 | 150 | 6 | 90 | 87 |
| Example 2 | 160 | 190 | 165 | 6 | 105 | 93 |
| Example 3 | 180 | 230 | 200 | 6 | 140 | Retort-packing heat treatment |
| Example 4 | 190 | 230 | 140 | 20 | 90 | 87 |
| Comparative example 1 | 170 | 210 | 125 | 20 | 90 |  |

In Table 1, the primary blow mold temperature represents the mold temperature used in the primary blow-molding step; the heating temperature, the temperature of the secondary intermediate product measured immediately after it has been taken out of the heating furnace; and the secondary blow mold temperature, the mold temperature used in the secondary blow-molding step.

In Example 1, molding was conducted under the conditions of a secondary blow mold temperature of 90° C. and a set time of 6 sec, with the temperature of the secondary intermediate product just before the secondary blow molding being set at 150° C., which was 60° C. higher than the secondary blow mold temperature.

The heating of the primary intermediate product in the heating furnace was adjusted, while cooling in the set time was taken into consideration, so that just before the secondary blow molding, the secondary intermediate product would have a temperature of 150° C. Thus, the secondary intermediate product had been adjusted to have a temperature of 170° C. just after it was taken out of the heating furnace. Namely, there was a temperature drop of 20° C. in the set time of 6 seconds.

The temperature of the secondary intermediate product drops with the lapse of the set time at a rate in the range of about 3-5° C./sec, depending on the temperature difference between the temperature at which the secondary intermediate product is taken out of the heating furnace and the ambient temperature. From this cooling rate and the set time, it is possible to determine the temperature of the secondary intermediate product to be taken out, or the extent to which the primary intermediate product should be heated in the heating furnace.

The bottle 6 thus obtained under these molding conditions had uniform wall thickness and good reproducibility of the bottle shape. The bottle 6 of Example 1 had a heat-resistant temperature of 87° C.

ing could be securely maintained at a temperature 50° C. higher than the secondary blow mold temperature of 90° C. As a result, the bottle 6 thus obtained had heat resistance to a temperature of 87° C. Even if a set time of several seconds cannot be available for any reason, such as the layout of the production equipment, a bottle 6 having heat resistance to a temperature in the range of 80-95° C. can still be obtained by using a set time within 20 seconds. Thus, the bottle 6 of Example 4 can be fully used in a wide field of applications.

However, if the set time exceeds 20 seconds, the heating temperature was required to be set at a temperature as high as, or higher than, 230° C. A whitening phenomenon occurred in the resultant secondary intermediate product, and it turned out that the bottle was commercially unsuitable as a finished product.

In Comparative Example 1, a set time of 20 seconds and a heating temperature of 210° C. were used. The secondary blow-molding temperature was 125° C., which was 35° C. higher than the secondary blow mold temperature of 90° C. The secondary blow molding gave a poor bottle shape. The shape of the secondary blow mold could not be reproduced correctly in the irregular portions and at the edges.

INDUSTRIAL APPLICABILITY

This invention having the above-described configuration has the following effects. In the invention of Claim 1, just before the secondary blow molding step of the double blow molding process, the secondary intermediate product is maintained at a temperature at least 40° C. higher than the secondary blow mold temperature. As a result, it is possible to provide bottles having a good shape, quite uniform wall thickness, and high reproducibility of the mold shape.

In the invention of Claim 2, just before the secondary blow molding step, the secondary intermediate product on standby is maintained at a temperature at least 50° C. higher than the secondary blow mold temperature. Then, a good shape is given not only to the bottles having ordinary heat resistance to a temperature in the range of 80-95° C., but also to the bottles having heat resistance to relatively high temperatures used for retort-packed foods.

In the invention of Claim 3, a set time within 20 seconds is used. This enables the bottles to have heat resistance to a temperature in the range of 80-95° C., at which the contents are heated and filled in the bottles. Thus, these bottles can be used in a wide field of applications.

In the invention of Claim 4, a set time within 6 seconds is used. This enables the process of this invention to be used in the heat treatment of retort-packed foods, and yet allows the bottles to have heat resistance to a temperature in the range of 80-95° C. Thus, it is possible to provide the bottles that can meet the requirement for a wide range of heat resistance and also to improve the production efficiency.

As described above, the double blow molding process of this invention specifies the lower limit to the temperature of the secondary intermediate product just before the secondary blow molding and the upper limit to the set time required till the secondary intermediate product is put in the secondary blow mold. These settings make it possible to determine the molding conditions for highly effective production in response to available equipment or necessary heat resistance.

The invention claimed is:

1. A process for biaxially drawing and blow-molding a polyethylene terephthalate resin bottle, which is a double blow molding process comprising:

a primary blow molding step of biaxially drawing and blow molding preform (1) into a primary intermediate product (4);

a step of heating said primary intermediate product (4) in the heating furnace to shrink-mold it into a secondary intermediate product (5); and a secondary blow molding step of molding said secondary intermediate product (5) into a bottle (6), wherein just before the secondary blow molding step, the secondary intermediate product (5) is standing by for the secondary blow molding step and is maintained at a temperature at least 40° C. higher than the mold temperature used in said secondary blow molding step.

2. The process for biaxially drawing and blow-molding the polyethylene terephthalate resin bottle, according to claim 1, wherein just before the secondary blow molding step, the secondary intermediate product (5) is maintained at a temperature at least 50° C. higher than the mold temperature used in the secondary blow molding step.

3. The process for biaxially drawing and blow-molding the polyethylene terephthalate resin bottle, according to claim 2, wherein the secondary intermediate product (5) is put in the secondary blow mold in not later than 20 seconds after said product (5) has been taken out of the heating furnace used in the previous step.

4. The process for biaxially drawing and blow-molding the polyethylene terephthalate resin bottle, according to claim 1, wherein the secondary intermediate product (5) is put in the secondary blow mold in not later than 20 seconds after said product (5) has been taken out of the heating furnace used in the previous step.

5. The process for biaxially drawing and blow molding the polyethylene terephthalate resin bottle, according to claim 4, wherein the secondary intermediate product (5) is put in the secondary blow mold in not later than 6 seconds after said product (5) has been taken out of the heating furnace used in the previous step.

* * * * *